May 29, 1928.
C. R. MABEE
1,671,118
APPARATUS FOR PRODUCING LIVE STOCK FEEDS
Filed Jan. 14, 1921
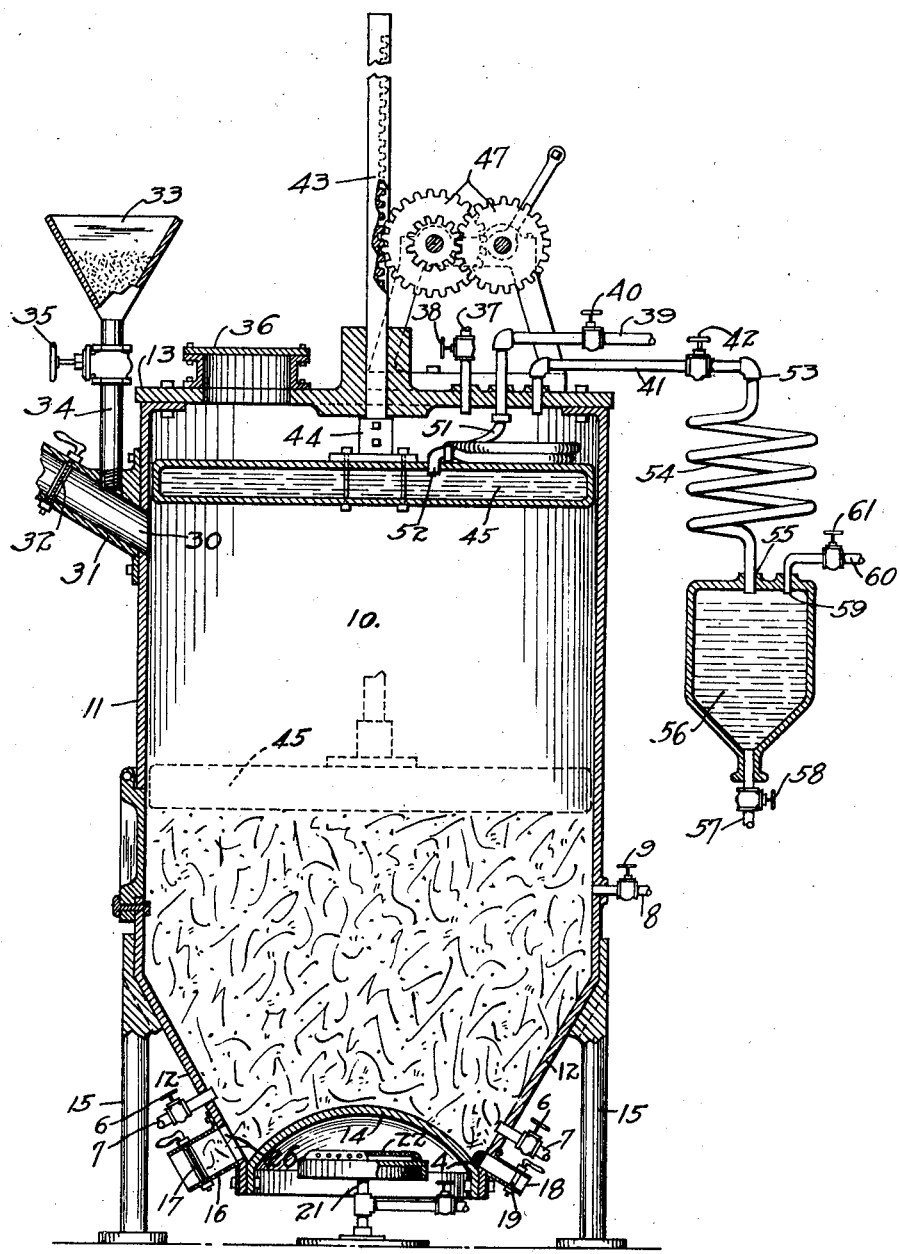
Inventor
Charles R. Mabee, Patented May 29, 1928.

1,671,118

UNITED STATES PATENT OFFICE.

CHARLES R. MABEE, OF BUFFALO, NEW YORK, ASSIGNOR TO MABEE PATENTS CORPORATION, OF DOVER, DELAWARE, A CORPORATION OF DELAWARE.

APPARATUS FOR PRODUCING LIVESTOCK FEEDS.

Application filed January 14, 1921. Serial No. 437,309.

The object of the invention is to provide a process and apparatus for the treatment of farm products, particularly in the preparation of vegetable juices and live stock feeds.

The invention has special reference to a process and apparatus adapted for use on farms, for the treatment of live stock feed materials, and involves, among other things, the use of internal mechanical pressure within a container, and the use of heat, moisture and ferments, applied to the farm crops during their treatment, and also, the evaporation of volatile materials from the materials treated, together with the separation of condensable and non-condensable evaporable materials.

In the present commercial process of producing live stock feeds from coarse farm crops, either alone or combined with other feed materials, volatile substances are permitted to escape from the containers, as in the instance of alcohol and carbonic acid escaping from farm silos. Again, the silo process is slow and incomplete, due to the absence of suitable heat, moisture, pressure and ferments, to promote more rapid physical and chemical changes necessary to desirable treatment.

In the accompanying drawing:

The figure is a longitudinal section, partly broken away, of an apparatus suitable for my invention.

Referring more particularly to the drawing 10 is a container partly closed, but not hermetically sealable, at its upper end by the plate 13 and closed at its lower end by the concave plate 14, seated in the lower section of the cone bottom shown at 12, which cone is attached to the retaining wall 11. The cone 12 is provided with the orifice 26 to which is connected the outlet pipe 16 provided with regulating valve 17, also with the orifice 4 to which is connected the liquid outlet pipe 18 provided with the regulating valve 19, also with the pipe connection shown at 7 provided with the regulating valve 6.

Appropriately positioned within the concave area created by the plate 14, is a combustion means 22 connected with fuel oil pipe 21.

Container 10 is supported by standards 15. The wall 11 is provided with a pipe connection 8 in which is seated a regulating valve 9, also with an orifice 30 connected with a pipe 31 provided with valve 32. The connection 31 is connected with a hopper 33 by means of pipe 34 provided with valve 35.

The plate 13 closing the upper end of container 10 is provided with manhole 36, with pipe connection 37 provided with the valve 38, with pipe 39 provided with valve 40, with pipe 41 provided with valve 42, and centrally positioned in the end plate 13, and passing through the end plate is the vertically disposed shaft 43 to the lower extremity of which, within the container, is firmly attached by means of the casting 44 a pressure plunger 45, adapted to be moved vertically by gear wheels 47, cooperating with the shaft 43.

The pressure plunger 45, by means of the hose connection 51, is connected with pipe 39 through a suitable connection shown at 52, thereby enabling the pressure plunger to be filled with fluid to regulate its weight at the will of the operator.

The outer extremity of the pipe 41 is provided at 53 with a connection to condensing coil 54, the lower extremity of which at 55 is connected with reservoir 56 provided with outlet pipe 57 in which is seated valve 58, while the reservoir at 59 is connected with pipe 60 in which is seated valve 61.

This apparatus is adapted for the production of feeds on farms from comminuted coarse crops, such as fodders, stover, hay and other like products, including unthreshed cereal products. Cereals may be combined with the coarse crops.

In practicing my invention the raw feeds in a comminuted state are introduced into the container through orifice 30, during which time hopper 33 is filled with ground diastatic malt and valve 35 so adjusted as to permit a suitable amount i. e., about 5% of the diastatic material to flow through pipe 34 into the inlet pipe 31, and thereby the feeds to be treated are somewhat uniformly impregnated with the enzymes or ferments. The raw feeds to be treated may be dampened before being introduced into the container so as to prevent the ground ferments from falling through the materials, and to secure a more even distribution of the materials.

When the container is filled to the orifice 30, the pressure plunger 45 is lowered to pack the materials in the container, and again elevated to the position shown in the drawing and additional raw feeds introduced, after which it is again lowered to pack them in the container.

During the period when the container is being filled, liquid materials may be introduced into the upper end of the container through pipe 37 guarded by valve 38, the water or other dampening medium being spread by the upper surface of the pressure plunger around and about the outer walls of the container, or, water, or an infusion of malt may be introduced through pipe 8 guarded by valve 9.

In practice, it is desirable that, before the container is filled, water be introduced therein sufficient to cover the lower surface of the container, and that heat be applied by means of the burner 22 sufficient to heat the water and walls of the container, which heat, combined with water which may be introduced through pipe 37 at a temperature of about 160 degrees Fahrenheit, furnishes sufficient heat to maintain the feeds introduced at a temperature approximating 140 degrees Fahrenheit, when diastase is used as the ferment.

This apparatus is usually placed in a closed room, such as a farm granary free from drafts, and by packing the materials into the container at a temperature approximating 140 degrees Fahrenheit, the feeds remain at a temperature appropriate for the conversion of starches into sugars, sufficiently long to produce malted feeds.

The feeds are then removed from the lower end of the container in a moist, and usually in a heated, condition.

As feeding materials are removed from the lower end of the container through orifice 26, as required for immediate use, additional raw feed is introduced through orifice 30 to replace the feed removed, in the same manner as previously described. By this procedure the apparatus is in operation at all times.

The container 10 is preferably a cylindrical container vertically disposed, and it is of advantage that the lower end plate 12 be tapering in nature, to assist in the ready exit of the materials treated through the orifice 26. The concave plate 24 seated in the lower portion of the tapering end plate 12 also assists in the ready exit of the materials, and provides a suitable surface for the application of heat.

The vapors and gases which are formed during the treatment of raw feeding materials pass from the container by means of the pipe 41 to a condensing coil 54, thence to the receiver 86, from which the condensable portions may be removed by pipe 57 and the non-condensable portions by means of the pipe 60.

Having described my invention, what I claim as new and desire to secure by Letters Patent is:

1. In an apparatus for preparing feeding materials, the combination of a container closed at one end and substantially closed at the other, with means for introducing materials into said container, means for compressing said materials, and means for regulating the weight of said compressing means.

2. In an apparatus for preparing feeding materials, the combination of a vertically disposed cylindrical container, closed at one end and substantially closed at the other, with a pipe having a hopper attached thereto leading into the upper part of said container, a pressure plunger having a compartment therein for the reception of a weighting medium and actuated by a positive gearing, valved pipes, one leading into the top and one into the side of said container, for introducing a moistening medium, orifices with valved pipe connections for removing materials from said container, a burner positioned beneath the lower end of said container for heating the same, and a condensing coil and a reservoir connected with the upper end of the container by means of a valved pipe.

3. In an apparatus for preparing feeding materials, a vertically-disposed container, substantially closed at both its ends and including an upwardly-bowed base-plate, heating means disposed within the recess formed by said base-plate, means to permit the introduction of materials to be treated into the upper portion of the container, means disposed at one side of said base-plate and arranged to permit the withdrawal of materials from said container, a pressure plunger disposed across said container and movable downwardly therein, and a valved pipe connection extending through the side wall of the container to permit the introduction of a fluid-treating medium therein.

CHARLES R. MABEE.

CERTIFICATE OF CORRECTION.

Patent No. 1,671,118.                                            Granted May 29, 1928, to

CHARLES R. MABEE.

It is hereby certified that error appears in the printed specification of the above numbered patent requiring correction as follows: Page 1, lines 2, 6 and 7, strike out the words "a process and" and insert the word "an"; line 4, strike out the words "vegetable juices and"; line 13, beginning with the word "and" strike out all to and including the word "materials" line 17; line 18, strike out the word "commercial", and line 21, beginning with the word "volatile" strike out all to and including the word and comma "Again,"; and that the said Letters Patent should be read with these corrections therein that the same may conform to the record of the case in the Patent Office.

Signed and sealed this 31st day of July, A. D. 1928.

(Seal)                                                                                M. J. Moore,
                                                                                      Acting Commissioner of Patents.